(12) United States Patent
Bharghavan et al.

(10) Patent No.: US 8,995,459 B1
(45) Date of Patent: Mar. 31, 2015

(54) RECOGNIZING APPLICATION PROTOCOLS BY IDENTIFYING MESSAGE TRAFFIC PATTERNS

(75) Inventors: Vaduvur Bharghavan, Morgan Hill, CA (US); Shishir Varma, Sunnyvale, CA (US); Sung-Wook Han, Sunnyvale, CA (US)

(73) Assignee: Meru Networks, Sunnyvale, CA (US)

( * ) Notice: Subject to any disclaimer, the term of this patent is extended or adjusted under 35 U.S.C. 154(b) by 138 days.

(21) Appl. No.: 12/827,295

(22) Filed: Jun. 30, 2010

Related U.S. Application Data

(63) Continuation of application No. 11/899,998, filed on Sep. 7, 2007, now Pat. No. 7,894,436.

(51) Int. Cl.
| | |
|---|---|
| *H04L 12/54* | (2013.01) |
| *G06F 7/04* | (2006.01) |
| *G06F 12/00* | (2006.01) |
| *G06F 12/14* | (2006.01) |
| *G06F 13/00* | (2006.01) |
| *G06F 17/30* | (2006.01) |
| *G11C 7/00* | (2006.01) |
| *H04L 12/26* | (2006.01) |

(52) U.S. Cl.
CPC .................................. *H04L 12/2676* (2013.01)
USPC ........... 370/429; 370/232; 370/235; 370/413; 726/3; 726/20

(58) Field of Classification Search
USPC ......... 370/230, 232, 235, 450, 909, 412, 413, 370/414, 429; 726/2–13, 18–20; 380/277–286, 44–47
See application file for complete search history.

(56) References Cited

U.S. PATENT DOCUMENTS

| | | | |
|---|---|---|---|
| 3,956,749 | A | 5/1976 | Magorian |
| 5,038,151 | A | 8/1991 | Kaminski |
| 5,125,108 | A | 6/1992 | Talwar |
| 5,177,788 | A | 1/1993 | Schanning et al. |

(Continued)

FOREIGN PATENT DOCUMENTS

| | | |
|---|---|---|
| JP | 2005311580 | 11/2005 |
| JP | 2006229972 | 8/2006 |

OTHER PUBLICATIONS

Amir. "Fast Handoff for Seamless Wireless Mesh Networks." MobiSys '06, Jun. 19-22, 2006, pp. 83-95, ACM, Uppsala, Sweden.

(Continued)

*Primary Examiner* — Benjamin H Elliott, IV
(74) *Attorney, Agent, or Firm* — Law Office of Dorian Cartwright

(57) ABSTRACT

A communication system detects particular application protocols in response to their message traffic patterns, which might be responsive to packet size, average packet rate, burstiness of packet transmissions, or other message pattern features. Selected message pattern features include average packet rate, maximum packet burst, maximum future accumulation, minimum packet size, and maximum packet size. The system maintains a counter of packet tokens, each arriving at a constant rate, and maintains a queue of real packets. Each real packet is released from the queue when there is a corresponding packet token also available for release. Packet tokens overfilling the counter, and real packets overfilling the queue, are discarded. Users might add or alter application protocol descriptions to account for profiles thereof.

11 Claims, 2 Drawing Sheets

(56) References Cited

U.S. PATENT DOCUMENTS

Figure 1:
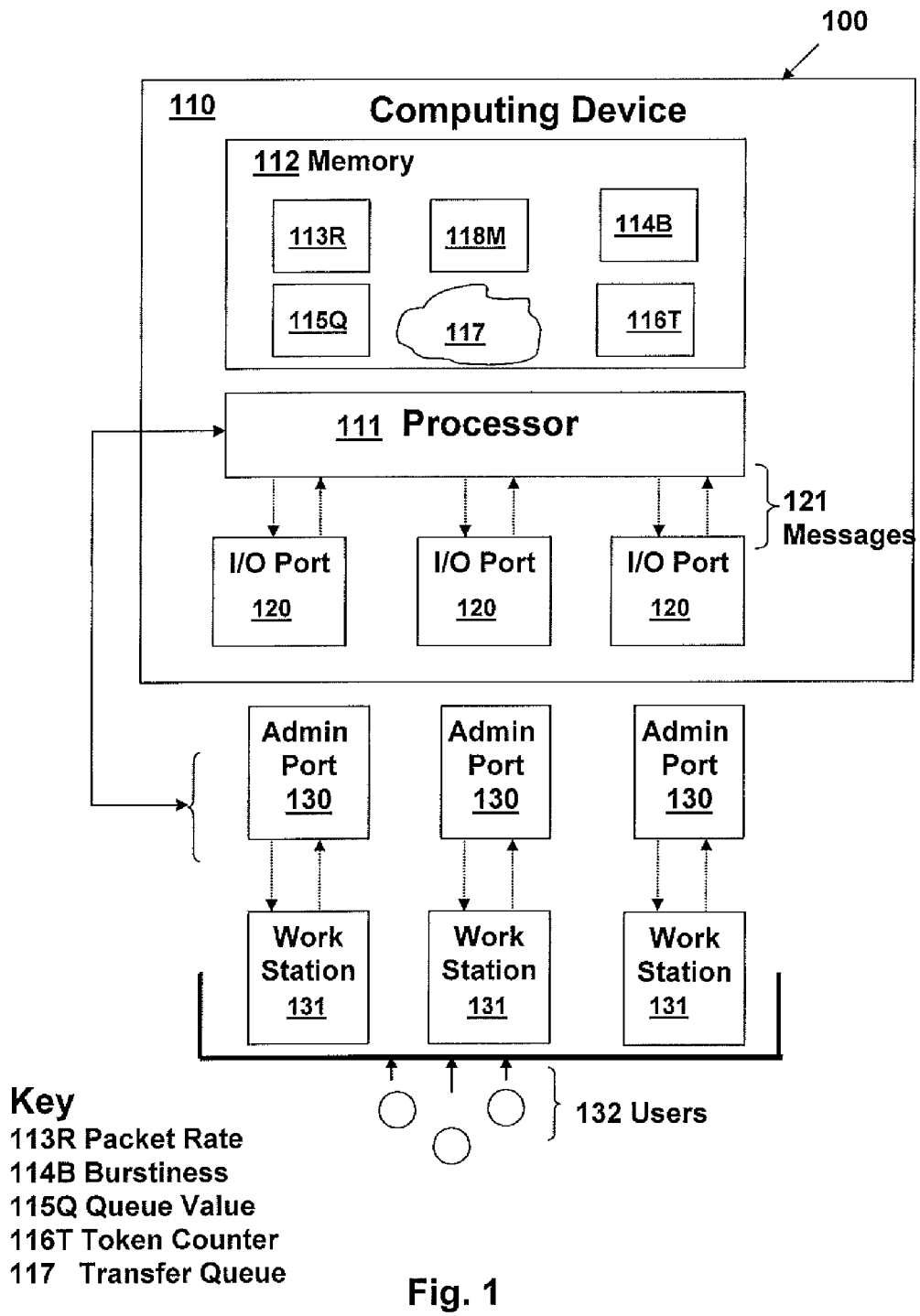

| | | | |
|---|---|---|---|
| 5,337,397 A | 8/1994 | Lebby et al. | |
| 5,519,706 A | 5/1996 | Bantz et al. | |
| 5,884,272 A | 3/1999 | Walker et al. | |
| 5,966,094 A | 10/1999 | Ward et al. | |
| 6,023,621 A | 2/2000 | Jackson et al. | |
| 6,147,970 A * | 11/2000 | Troxel | 370/235 |
| 6,252,950 B1 * | 6/2001 | Duty et al. | 379/111 |
| 6,557,112 B1 | 4/2003 | Shimada | |
| 6,658,047 B1 | 12/2003 | Komulainen et al. | |
| 6,728,603 B2 | 4/2004 | Pruzan et al. | |
| 6,760,318 B1 | 7/2004 | Bims | |
| 6,788,658 B1 | 9/2004 | Bims | |
| 6,839,038 B2 | 1/2005 | Weinstein | |
| 6,877,043 B2 | 4/2005 | Mallory et al. | |
| 6,894,649 B2 | 5/2005 | Ostervall | |
| 6,933,909 B2 | 8/2005 | Theobold | |
| 6,950,629 B2 | 9/2005 | Nagy | |
| 6,954,177 B2 | 10/2005 | Channabasappa et al. | |
| 6,978,158 B2 | 12/2005 | Ghavami | |
| 6,999,802 B2 | 2/2006 | Kim | |
| 7,171,215 B2 | 1/2007 | Khouaja et al. | |
| 7,194,008 B2 | 3/2007 | Chu et al. | |
| 7,197,308 B2 | 3/2007 | Singhal et al. | |
| 7,225,271 B1 * | 5/2007 | DiBiasio et al. | 709/240 |
| 7,277,728 B1 | 10/2007 | Kauhanen | |
| 7,280,477 B2 * | 10/2007 | Jeffries et al. | 370/235 |
| 7,319,685 B2 | 1/2008 | Kim et al. | |
| 7,333,455 B1 | 2/2008 | Bolt et al. | |
| 7,359,362 B2 | 4/2008 | King et al. | |
| 7,400,604 B2 | 7/2008 | Lee et al. | |
| 7,403,506 B2 | 7/2008 | Lee et al. | |
| 7,406,319 B2 | 7/2008 | Kostic et al. | |
| 7,420,942 B2 | 9/2008 | Wang | |
| 7,426,388 B1 | 9/2008 | Wright et al. | |
| 7,430,397 B2 | 9/2008 | Suda et al. | |
| 7,433,722 B2 | 10/2008 | Sakamoto et al. | |
| 7,466,981 B1 | 12/2008 | Abdelmahid et al. | |
| 7,515,909 B2 | 4/2009 | Jain et al. | |
| 7,555,287 B1 | 6/2009 | Heinonen et al. | |
| 7,620,988 B1 * | 11/2009 | Hernacki | 726/23 |
| 7,630,402 B2 | 12/2009 | Un et al. | |
| 7,693,513 B2 | 4/2010 | Chou | |
| 7,826,426 B1 | 11/2010 | Bharghavan et al. | |
| 7,843,910 B2 | 11/2010 | Loughran et al. | |
| 8,027,637 B1 | 9/2011 | Bims | |
| 8,090,374 B2 | 1/2012 | Rezvani et al. | |
| 8,472,359 B2 | 6/2013 | Bharghavan et al. | |
| 2002/0022483 A1 | 2/2002 | Thompson et al. | |
| 2002/0060995 A1 | 5/2002 | Cervello et al. | |
| 2002/0086640 A1 | 7/2002 | Belcher et al. | |
| 2002/0110085 A1 | 8/2002 | Ho et al. | |
| 2002/0112008 A1 | 8/2002 | Christenson et al. | |
| 2002/0131404 A1 * | 9/2002 | Mehta et al. | 370/352 |
| 2002/0147031 A1 | 10/2002 | Hood | |
| 2002/0181629 A1 | 12/2002 | Shibata | |
| 2003/0065809 A1 * | 4/2003 | Byron | 709/232 |
| 2003/0097595 A1 * | 5/2003 | Partridge et al. | 713/201 |
| 2003/0162546 A1 | 8/2003 | Jordan | |
| 2003/0198305 A1 | 10/2003 | Taylor et al. | |
| 2003/0199247 A1 | 10/2003 | Striemer | |
| 2003/0206532 A1 | 11/2003 | Shpak | |
| 2003/0206535 A1 | 11/2003 | Shpak | |
| 2003/0207697 A1 | 11/2003 | Shpak | |
| 2003/0207698 A1 | 11/2003 | Shpak | |
| 2003/0207699 A1 | 11/2003 | Shpak | |
| 2003/0231648 A1 * | 12/2003 | Tang | 370/450 |
| 2003/0236103 A1 | 12/2003 | Tamaki et al. | |
| 2004/0051668 A1 | 3/2004 | Chang | |
| 2004/0063455 A1 | 4/2004 | Eran et al. | |
| 2004/0105434 A1 | 6/2004 | Baw | |
| 2004/0121770 A1 | 6/2004 | Tigerstedt et al. | |
| 2004/0141617 A1 | 7/2004 | Volpano | |
| 2004/0156399 A1 | 8/2004 | Eran | |
| 2004/0183726 A1 | 9/2004 | Theobold | |
| 2004/0185904 A1 | 9/2004 | Yamakita | |
| 2004/0235453 A1 | 11/2004 | Chen et al. | |
| 2005/0054370 A1 | 3/2005 | Shpak | |
| 2005/0111405 A1 | 5/2005 | Kanterakis | |
| 2005/0122919 A1 | 6/2005 | Touag | |
| 2005/0135321 A1 | 6/2005 | Sharony | |
| 2005/0152314 A1 | 7/2005 | Sun et al. | |
| 2005/0153713 A1 | 7/2005 | Sharony | |
| 2005/0156794 A1 | 7/2005 | Theobold et al. | |
| 2005/0156799 A1 | 7/2005 | Theobold | |
| 2005/0195110 A1 | 9/2005 | Lin et al. | |
| 2005/0219143 A1 | 10/2005 | Schadler et al. | |
| 2005/0220048 A1 | 10/2005 | Lee et al. | |
| 2005/0238054 A1 | 10/2005 | Sharma | |
| 2006/0002331 A1 | 1/2006 | Bhagwat et al. | |
| 2006/0007914 A1 | 1/2006 | Chandra et al. | |
| 2006/0025127 A1 | 2/2006 | Cromer et al. | |
| 2006/0049987 A1 | 3/2006 | Herrick | |
| 2006/0056443 A1 | 3/2006 | Tao et al. | |
| 2006/0098613 A1 | 5/2006 | Kish et al. | |
| 2006/0111112 A1 | 5/2006 | Maveddat | |
| 2006/0132360 A1 | 6/2006 | Caimi et al. | |
| 2006/0215691 A1 | 9/2006 | Kobayashi et al. | |
| 2006/0221993 A1 | 10/2006 | Liao et al. | |
| 2006/0281500 A1 | 12/2006 | Huang et al. | |
| 2007/0011317 A1 | 1/2007 | Brandyburg et al. | |
| 2007/0014267 A1 | 1/2007 | Lam et al. | |
| 2007/0091805 A1 | 4/2007 | Ramprashad et al. | |
| 2007/0117514 A1 | 5/2007 | Gainey et al. | |
| 2007/0121596 A1 | 5/2007 | Kurapati et al. | |
| 2007/0165610 A1 | 7/2007 | Tseng et al. | |
| 2007/0213071 A1 | 9/2007 | Hwang | |
| 2007/0238438 A1 | 10/2007 | Alon et al. | |
| 2008/0014956 A1 | 1/2008 | Balasubramanian | |
| 2008/0080414 A1 | 4/2008 | Thubert et al. | |
| 2008/0102835 A1 | 5/2008 | Zhao et al. | |
| 2008/0112373 A1 | 5/2008 | Shpak | |
| 2008/0153497 A1 | 6/2008 | Kalhan | |
| 2008/0165866 A1 | 7/2008 | Teo et al. | |
| 2008/0212535 A1 | 9/2008 | Karaoguz et al. | |
| 2008/0242305 A1 | 10/2008 | Kahlert et al. | |
| 2008/0261602 A1 | 10/2008 | Livneh | |
| 2008/0287130 A1 | 11/2008 | Laroia et al. | |
| 2009/0022127 A1 | 1/2009 | Traynor et al. | |
| 2009/0023434 A1 | 1/2009 | Trainor et al. | |
| 2009/0061873 A1 | 3/2009 | Bao et al. | |
| 2009/0061879 A9 | 3/2009 | Gallagher et al. | |
| 2009/0111472 A1 | 4/2009 | Promenzio | |
| 2010/0080151 A1 | 4/2010 | Proctor et al. | |
| 2010/0182929 A1 | 7/2010 | Abraham et al. | |
| 2011/0075613 A1 | 3/2011 | Yuan | |
| 2011/0305217 A1 | 12/2011 | Seok | |
| 2013/0010655 A1 | 1/2013 | Ho | |
| 2013/0148609 A1 | 6/2013 | Ram et al. | |

OTHER PUBLICATIONS

Business Wire. "Meru Networks Delivers Industry's Only Zero-Loss Mobility Across WLAN Access Points and IP Subnets." Jun. 21, 2004, pp. 1-2.

Chen et al. "A Seamless Handoff Mechanism for OHCP-Based IEEE 802.11 WLANS." IEEE Communications Letters, Aug. 2007, pp. 665-667, vol. 1, No. 8.

Cheung et al. "Network Configurations for Seamless Support of COMA Soft Handoffs Between Cell Clusters." IEEE Journal on Selected Areas in Communications, Sep. 1997, pp. 1276-1278, vol. 15, No. 7.

Chou et al. "Intelligent Agent Over WLAN With Seamless Handover and Load Balancing." 2006 International Conference on Communication Technology, Nov. 27-Nov. 30, 2006, pp. 1-7, IEEE. (Abstract).

Chui et al. "An Access Point Coordination System for Improved VoIP/WLAN Handover Performance." IEEE, 2006, pp. 501-505.

Fan et al. "Managing Heterogeneous Access Networks." 32nd IEEE Conference on Local Computer Networks, 2007, pp. 651-658, IEEE 2007, pp. 651-658.

Finneran. "Can WLAN switches support voice? Today's controllers offer key security and QoS capabilities, but as always, the devil's in the details." Business Communications Review, Oct. 2006, pp. 42-47.

(56) References Cited

OTHER PUBLICATIONS

Huang et al. "Incorporating AP Selection and Call Admission Control for Seamless Handoff Procedure." Proceedings of the International Conference on Computer and Communication Engineering 2008, pp. 823-826.

Huang et al. "SAP: Seamless Authentication Protocol for Vertical Handoff in Heterogeneous Wireless Networks." Third International Conference in Heterogeneous Wired/Wireless Networks, Aug. 7-9, 2006, pp. 1-10, Waterloo, ON, CA.

Hur et al. "A Distributed-Requested-Based Diffserv CAC for Seamless Fast-Handoff in Mobile Internet." J. Sole-Pareta et al. (Eds.): Q of IS 2004: International Workshop on Quality of Future Internet Services, LNCS 3266, pp. 184-193, 2004.

IEEE Std 802. 11-1997 Information Technology—telecommunications and Information exchange between systems—Local and Metropolitan Area Networks—specific Requirements—part 11: Wireless Lan Medium Access Control (MAC) and Physical Layer (PHY) Specifications, IEEE Std 801.11-1997, vol., no., pp. i-445, Nov. 18, 1997.

IEEE. "Part 11: Wireless LAN Medium Access Control (MAC) and Physical Layer (PHY) specifications." IEEE Std. 802.11, 1999 Edition (R2003), 2003, vol. no. pp. i-513.

Jang et al. "Mobility Support Algorithm Based on Wireless 802.11 b LAN for Fast Handover." 5th International Conference, PDCAT 2004, Dec. 8-10, 2004, pp. 715-718, Springer Verlag. (Abstract).

Zhou et al. "A Seamless Handoff Scheme for Mobile IP." 2006 IEEE 63rd Vehicular Technology Conference, VTC 2006-Spring, May 7, Jul. 10, 2006, pp. 927-931, IEEE. (Abstract).

Kist. "Instant Handoffs for Wireless Infrastructure Meshed Networks." Proceedings of the 2008 Australasian Telecommuncation Networks and Applications Conference, 2008, pp. 288-293.

Liao et al. "Practical Schemes for Smooth MAC Layer Handoff in 802.11 Wireless Networks." Proceedings of the 2006 International Symposium on a World of Wireless, Mobile and Multimedia Networks. IEEE, 2006, pp. 1-10.

LV. "Intelligent Seamless Vertical Handoff Algorithm for the Next Generation Wireless Networks." Mobilware '08, Feb. 12-15, 2008, pp. 1-10, Innsbruck, Austria.

Mannion. "Foundry Networks enters WLAN management fray—Bets on integration with wired infrastructure, market timing to take on Cisco." Electronic Engineering Times, Sep. 8, 2003, p. 32, No. 1286.

Manodham. "A Seamless Handoff Scheme with a New AP Module for Wireless LANs Support VoIP." 2006. International Symposium on Applications on the Internet, Saint 2006, Jan. 23-27, 2006, pp. 253-258, IEEE. (Abstract).

Manodham et al. "A Seamless Handoff Scheme with New AP Module for Wireless LANs support VoIP." Proceedings of the 2005 Symposium on Applications and the Internet, 2006, pp. 1-6, IEEE.

Marsh. "Power and wireless options extend Ethernet's reach: Ethernet's power-delivery and wireless abilities offer new application potential that hugely extends the reach of the IEEE's 802.X series of standards." EDN, Nov. 11, 2004, p. 67, Reed Business Information.

Murray et al. "Intelligent Access and Mobility Management in Heterogeneous Wireless Networks Using Policy." ACM First International Workshop on Information and Communication Technologies, 2003, pp. 181-186.

Rist et al. "Wireless LANS—Look Ma . . . No Wires—Wireless networking products prove they are finally ready for prime time." Internetweek, Mar. 20, 2000, p. 41, No. 805, CMP Media, Inc.

Sattari et al. "Seamless Handover Between WLAN and UMTS." 2004 IEEE 59th Vehicular Technology Conference, VTC2004-Spring: Towards a Global Wireless World, May 17-19, 2004, pp. 3035-3038, IEEE. (Abstract).

Thomsen. "Development Platform for Dynamic Bandwidth Allocation Schemes in Future MPCP Enabled Ethernet Passive Optical Network (EPON)," WSEAS Transactions on Communications, Apr. 5, 2006, pp. 92-98, WSEAS. (Abstract).

Wei et al. "Seamless Handoff Support in Wireless Mesh Networks." 2006, pp. 1-8, IEEE.

Xhafa et al. "Seamless Handover in Building Using HVAC Ducts: A New System Architecture." IEEE Global Telecommunications Conference GLOBECOM'03, Dec. 1-5, 2003, pp. 3093-3097, IEEE. (Abstract).

Yaakob et al. "An Integration of Mobile Motion Prediction with Dedicated Solicitation Message for Seamless Handoff Provisioning in High Speed Wireless Environment." 2008 International Conference on Electronic Design, Dec. 1-3, 2008, Pernang, Malaysia, pp. 1-5.

Yamagata et al. "Seamless Handover for Hotspot Network Using Adaptive Flow Control Method." 2005 Asia—Pacific Conference on Communications, Oct. 3-5, 2005, pp. 502-506, IEEE. (Abstract).

Zhou et al. A Seamless Handoff Scheme for Mobile IP. IEEE Vehicular Technology Conference, 2006, pp. 927-931, vol. 2.

\* cited by examiner

RECOGNIZING APPLICATION PROTOCOLS BY IDENTIFYING MESSAGE TRAFFIC PATTERNS

CROSS-REFERENCE TO RELATED APPLICATION

This application claims priority of U.S. patent application Ser. No. 11/899,998, now allowed, filed Sep. 7, 2007, in the name of the same inventors, titled "Flow Inspection," hereby incorporated by reference as if fully set forth herein.

BACKGROUND

In communication networks, it is sometimes advantageous to recognize and specially treat messages including selected application protocols. Many communication networks use a multi-level protocol schema, in which more sophisticated protocols are carried as payload information for less sophisticated protocols. One such multi-level protocol schema is the OSI/ISO model, including distinct protocol levels from level 1 through level 7 inclusive.

One problem in the known art is that it is sometimes difficult to recognize those protocols carried as payload information (level 7 protocols in the OSI/ISO model). They can be difficult to recognize in part because such recognition involves decoding each succeeding level of application protocol, with the intent of detecting the particular level 7 protocol desired to be detected. They can also be difficult to recognize in part because those application protocols might be encrypted, with the intent of preventing outsiders to the protocol communication from reading or even detecting the use of that particular application protocol. They can also be difficult to recognize in part because the application protocols, even if unencrypted, may not be known to the communication network, and can therefore not be parsed as messages traverse the network.

One known method for detecting particular application protocols is to attempt "deep packet" inspection of some or all message packets, with the intent of detecting content believed to be characteristic of the particular application protocol desired to be detected. While this method might have some value in detecting particular application protocols when those application protocols are (1) relatively easy to decode, (2) unencrypted, and (3) understood by the communication network, it is subject to drawbacks when those conditions are not true.

DESCRIPTION OF THE EMBODIMENT

Nature of the Description

Read this application in its most general form. This includes, without limitation:

References to specific structures or techniques include alternative or more general structures or techniques, especially when discussing aspects of the invention, or how the invention might be made or used.

References to "preferred" structures or techniques generally mean that the inventor contemplates using those structures are techniques, and think they are best for the intended application. This does not exclude other structures or techniques for the invention, and does not mean that the preferred structures or techniques would necessarily be preferred in all circumstances.

References to $1^{st}$ contemplated causes or effects for some implementations do not preclude other causes or effects that might occur in other implementations, even if completely contrary, where circumstances would indicate that the $1^{st}$ contemplated causes or effects would not be as determinative of the structures or techniques to be selected for actual use.

References to $1^{st}$ reasons for using particular structures or techniques do not preclude other reasons or other structures or techniques, even if completely contrary, where circumstances would indicate that the $1^{st}$ structures or techniques are not as compelling. The invention includes those other reasons or other structures or techniques, especially where circumstances would indicate they would achieve the same effect or purpose as the $1^{st}$ reasons, structures, or techniques.

Overview of the Description

A communication system detects particular application protocols in response to their message traffic patterns. Traffic patterns might be responsive to packet size, average packet rate, burstiness of packet transmissions, and possibly other message pattern features. In one embodiment, the communication system might apply administrative rules to messages detected as being within those particular application protocols. For example, the communication system might apply administrative rules to ban Skype traffic, or to limit its use during business hours, or apply other and further types of restrictions.

In one embodiment, a system maintains values for average packet rate (R), maximum packet burst (B), maximum future accumulation (Q), minimum packet size (MIN), a maximum packet size (MAN, a minimum packet bound (MIN2), a maximum packet bound (MAX2), and a time interval (TI). A message traffic pattern is defined as a stream of packets that conform to packet size specifications.

In one embodiment, every packet that is between the lower and upper bounds of MIN2 and MAX2 respectively, is designated to belong to the message traffic pattern so long as there was at least one packet within the lower and upper bounds of MIN and MAX that arrived at the communication system within a previous time interval of TI. Other and further techniques for identifying packets as being within the message traffic pattern would also be workable, and are within the scope and spirit of the invention.

This has the effect of identifying message traffic patterns, and therefore particular application protocols, in response to several factors, including: average packet rate, burstiness, and packet size. Once the system is capable of identifying message traffic patterns, and therefore particular application protocols. It may decide what treatment to accord message to identified.

The system maintains a B-size counter of packet tokens, each arriving at a constant rate R, i.e., one arriving each 1/R time units. It is also possible to generate the tokens arriving according to a distribution function different from constant arrival, but with an average rate R. For example, a distribution function such as a Poisson arrival time, a Bernoulli arrival time, or some other distribution function, would also work, and is within the scope and spirit of the invention.

The system also maintains a Q-size queue of real packets, i.e., each maintaining a real packet that arrives and is designated as part of the message traffic pattern according to the packet size specification described above. Each real packet is released from the queue when there is a corresponding packet token also available for release. Packet tokens overfilling the B-size counter, and real packets overfilling the Q-size queue, are discarded.

In alternative embodiments, there may be other mappings between packets and tokens, the one-for-one mapping between packets and tokens being only a specific instance. Some examples of alternative mappings include:

- A mapping between packets and tokens that takes into account an amount of time it would take to transmit each packet, and consumes a number of tokens in response to that amount of time. In a simple example of such embodiments, the number of tokens consumed is a linear function of that amount of time. This approach allows for a "time based", as opposed to a "packet based", method of control of message traffic patterns.
- A mapping between packets and tokens that takes into account a size of each packet in bits, and consumes a number of tokens in response to that size in bits. In a simple example of such embodiments, the number of tokens consumed is a linear function of that size in bits. This approach allows for a "bitrate based", as opposed to a "packet based", method of control of message traffic patterns.

In one embodiment, the system includes a set of selected descriptions, using these values, for each particular application level protocol. Administrators and other users of the system might add or alter those descriptions to account for perceived profiles of application protocols, or to account for new particular application protocols of interest. In general, descriptions will include minimum values for R, B, Q, and specified bounds for MIN, MAX, MIN2, MAX2, and TI.

after reading this application, those skilled in the art will recognize that this technique, or similar techniques, for identifying message traffic patterns and therefore particular application protocols, might be combined with other and further techniques, such as deep packet inspection or other techniques for identifying particular application protocols.

Terms and Phrases

Read this application with the following terms and phrases in their most general form. The general meaning of each of these terms or phrases is illustrative, not in any way limiting.

The phrase "application protocol", and variants thereof, generally refers to any protocol capable of being payload data in another protocol.

Although this application provides greater detail regarding embodiments in which application protocols are included in level 7 of the OSI/ISO model, there is no particular reason to limit any part of this application in this regard.

The phrase "multi-level protocol schema", and variants thereof, generally refers to any technique by which application protocols are capable of being embedded in other protocols.

Although this application provides greater detail regarding embodiments in which the multi-level protocol schema includes the OSI/ISO model, there is no particular reason to limit any part of this application in this regard.

The phrase "message traffic pattern", and variants thereof, generally refers to any technique by which an application protocol is capable of being identified without review of its payload data, conformance to packet size bounds being one such technique.

Although this application provides greater detail regarding embodiments in which message traffic patterns are responsive to particular named message pattern features, there is no particular reason to limit any part of this application in this regard.

The phrase "message pattern feature", and variants thereof, generally refers to any aspect of message traffic identifiable by an external device not privy to the content of those messages.

Although this application provides greater detail regarding embodiments in which particular message pattern features are selected for use, there is no particular reason to limit any part of this application in this regard.

Although this application provides greater detail regarding embodiments in which message pattern features including packet size, average packet rate, and burstiness of packet transmissions, are selected for use, there is no particular reason to limit any part of this application in this regard.

Although this application provides greater detail regarding embodiments in which particular application protocols are detected in response to the following particular values:

average packet rate (R),
maximum packet burst (B),
maximum future accumulation (Q),
minimum packet size (MIN),
maximum packet size (MAN,
minimum packet bound [MIN2],
maximum packet bound [MAX2],
time interval [TI], there is no particular reason to limit any part of this application in this regard.

The term "packet", and variants thereof, generally refers to any message capable of being sent from one device to one or more destination devices.

Although this application provides greater detail regarding embodiments in which packets primarily act according to an IEEE 802 protocol variant, there is no particular reason to limit any part of this application in this regard.

Figures and Text

FIG. 1

A FIG. 1 shows a block diagram of a system.

A system 100 includes elements as represented in the FIG. 1, including at least: a computing device 110, one or more I/O ports 120, and one or more administrative ports 130.

The computing device 110 includes elements as represented in the FIG. 1, including at least: a processor 111, a set of operating memory (or mass storage) 112. The processor 111 operates under control of instructions maintained in the memory 112, and performs its operations on data maintained in the memory 112.

The operating memory 112 includes elements as represented in the FIG. 1, including at least: a data element representing an average packet rate 113 R, a data element representing a maximum burstiness 114 B, a data element representing a maximum accumulation queue value 115 Q, data element representing a token counter 116 T, a packet transfer queue 117, and a data element representing the message traffic pattern element 118 M.

The one or more I/O ports 120 are disposed to receive and/or send messages 121, e.g., packets. The processor 111 reads messages 121 from the I/O ports 120 when those messages 121 are to be input and writes messages 121 to the I/O ports 120 when those messages 121 are to be output.

The one or more administrative ports 130 are disposed to provide status information to, and receive instructions from, one or more administrative work stations 131, the latter being under the control of one or more users 132. Users 132 need not be specific human beings. They might be control programs operating at logically remote devices. They might be groups of users 132 collectively having the authority to provide status information and receive instructions. They need not be situated physically local to any particular device.

The processor 111 provides status information to the administrative ports 130, with the effect of providing information to the administrative workstations 131 and the users 132, upon requests directed to the processor 111 from those users 132.

The processor 111 receives and acts upon instructions from the administrative ports 130, with the effect of operating under the control of the users 132, upon requests directed to the processor 111 from those users 132.

Among instructions the users 132 might direct to the processor 111 are to:
  alter or add to parameters representing profiles identifying application protocols;
  identify new application protocols, including designating parameters representing profiles identifying those new application protocols.

Figure 2:
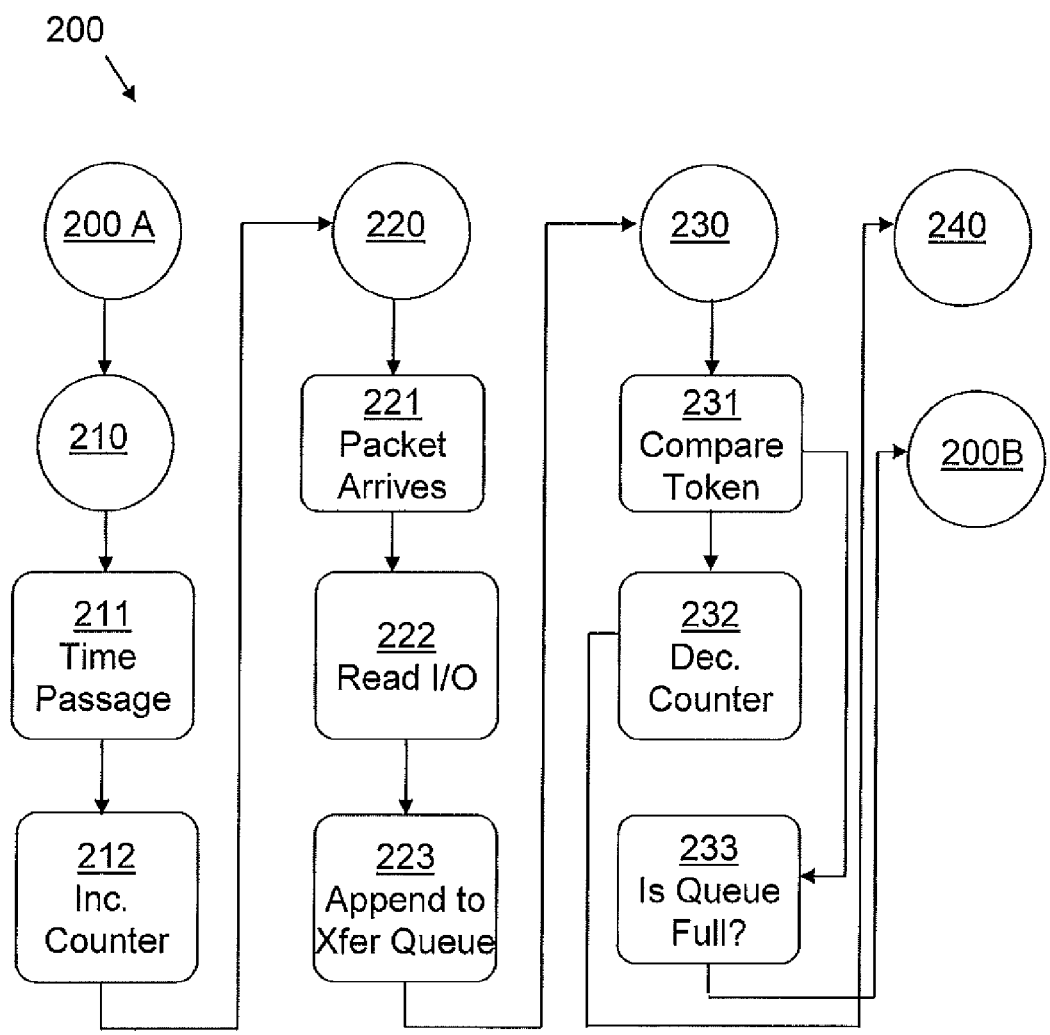

Operation of the system is described in other and further detail with respect to FIG. 2.

FIG. 2

A FIG. 2 shows a process diagram of a method.

The steps following each of the labels described with respect to the method 200 might be performed concurrently, in parallel, pipelined, or otherwise using multiple computing devices, with steps following some flow points being performed for newer data while steps following other flow points are performed for earlier data.

A method 200 includes labels and process steps as represented in the FIG. 2, including at least the following:
  Beginning of Method
  A label 200A indicates a beginning of the method 200.
  The method proceeds with a label 210.
  Token Counting
  A label 210 indicates that the method 200 is ready to count tokens.

At a step 211, the processor 111 notes the passage of a defined time duration, equal to a time in which one packet is expected to arrive, on average. This has the effect that if the average packet rate 113 parameter equals R, the processor 111 will note the passage of such time each 1/R time units.

At a step 212, the processor 111 increments the token counter 116 T according to the packet-to-token mapping, unless the token counter 116 T would exceed the maximum burstiness 114 value B as a consequence. In the latter case, the processor 111 sets (or maintains) the token counter 116 T at the maximum burstiness 114 value B.

The method proceeds with a label 220.
Packet Arrival
A label 220 indicates that the method 200 is ready to receive packets.

At a step 221, a packet arrives at an I/O port 120.

At a step 222, the processor reads the packet from the I/O port 120.

At a step 223, the processor appends the packet to the packet transfer queue 117 if the packet conforms to the message traffic pattern 118 M.

The method proceeds with a label 230.
Packet Release
A label 230 indicates that the method 200 is ready to release packets.

At a step 231, the processor 111 compares the token counter 116 T with a minimum value, in one embodiment, zero.

If the token counter 116 T exceeds its minimum value, i.e., the token counter 116 T is positive, the method 200 proceeds with the step 232, with the effect that the processor 111 releases packets.

If the token counter 116 T does not exceed its minimum value, i.e., the token counter 116 T is zero, the method 200 skips the step 232 and proceeds with the step 233, with the effect that the processor 111 does not release any packets.

At a step 232, the processor 111 decrements the token counter 116 T. In one embodiment, the processor 111 decrements the token counter 116 T by one for each packet to be released. In alternative embodiments, the processor 111 may decrement the token counter 116 T by an amount corresponding to the size of each packet to be released. Upon decrementing the token counter 116 T, the processor 111 removes the selected number of packets from the packet transfer queue 117 and sends them to one or more of the I/O ports 120.

The method 200 proceeds with the label 240.

At a step 233, the processor 111 determines if the packet transfer queue 117 is full, i.e., if there are already the maximum number of packets in the packet transfer queue 117 equal to the maximum accumulation queue value 115 Q.

If the packet transfer queue 117 is full, the processor 111 discards the packet. This has the effect that the packet transfer queue 117 remains full.

If the packet transfer queue 117 is not full, the processor 111 maintains the packet in the packet transfer queue 117. This has the effect of increasing the fullness of the packet transfer queue 117.

The method 200 proceeds with the label 200B.
End of Method
A label 200B indicates an end of the method 200.

Alternative Embodiments

After reading this application, those skilled in the art will recognize that the invention has wide applicability, and is not limited to the embodiments described herein.

The invention claimed is:

1. A computer-implemented method in a computing device of a wireless communication network for restricting use of applications, the method comprising the steps of:
  receiving a stream of network packets associated with a network source, the stream of packets having frames with data payloads that are encrypted;
  measuring a traffic pattern of the stream of network packets;
  identifying an application protocol of the stream of network packets based on parameters of the traffic patterns apart from the encrypted data payloads, the application protocol corresponding to an application in use by an end user; and
  applying a treatment associated with the application protocol, comprising:
    mapping tokens to the stream of network packets by making tokens available based on an expected probabilistic distribution function of the application protocol being restricted, wherein the expected probabilistic distribution function is nonlinear; and
    rejecting network packets from the stream of network packets that exceed available tokens and the allowed application use.

2. The method of claim 1, wherein the traffic pattern measurement comprises one or more of: minimum values for R (average packet rate), B (maximum packet burst), Q (maximum future accumulation) and specified bounds for MIN (minimum packet size), MAX (maximum packet size), MIN2 (minimum packet bound), MAX2 (maximum packet bound) and TI (time interval).

3. The method of claim 1, wherein identifying the application protocol is further based on deep packet inspection of a payload of one or more packets from the stream of network packets.

4. The method of claim 1, wherein the application protocol is defined at level 7 of the OSI/ISO model.

5. The method of claim 1, further comprising:
mapping tokens to the stream of network packets by making tokens available according to an expected probabilistic distribution function that is not constant; and
rejecting network packets from the stream of network packets that exceed available tokens.

6. A non-transitory computer-readable medium storing instructions that, when executed by a processor, perform a method in a computing device of a wireless communication network for restricting use of applications, the method comprising the steps of:
receiving a stream of network packets associated with a network source, the stream of packets having frames with data payloads that are encrypted;
measuring a traffic pattern of the stream of network packets;
identifying an application protocol of the stream of network packets based on parameters of the traffic patterns apart from the encrypted data payloads, the application protocol corresponding to an application in use by an end user; and
applying a treatment associated with the application protocol, comprising:
mapping tokens to the stream of network packets by making tokens available based on an expected probabilistic distribution function of the application protocol being restricted, wherein the expected probabilistic distribution function is nonlinear; and
rejecting network packets from the stream of network packets that exceed available tokens and the allowed application use.

7. The computer-readable medium of claim 6, wherein the traffic pattern measurement comprises one or more of: minimum values for R (average packet rate), B (maximum packet burst), Q (maximum future accumulation) and specified bounds for MIN (minimum packet size), MAX (maximum packet size), MIN2 (minimum packet bound), MAX2 (maximum packet bound) and TI (time interval).

8. The computer-readable medium of claim 6, wherein identifying the application protocol is further based on deep packet inspection of a payload of one or more packets from the stream of network packets.

9. The computer-readable medium of claim 6, wherein the application protocol is defined at level 7 of the OSI/ISO model.

10. The computer-readable medium of claim 6, wherein the treatment restricts use of the application protocol during preconfigured business hours.

11. A computing device, comprising:
a processor; and
a memory, comprising:
an interface to receive a stream of network packets associated with a network source, the stream of packets having frames with data payloads that are encrypted;
a traffic measurement module to measure a traffic pattern of the stream of network packets;
an application identifying module to identify an application protocol of the stream of network packets based on parameters of the traffic patterns apart from the encrypted data payloads, the application protocol corresponding to an application in use by an end user; and
a treatment application module to apply a treatment associated with the application protocol, comprising:
mapping tokens to the stream of network packets by making tokens available based on an expected probabilistic distribution function of the application protocol being restricted, wherein the expected probabilistic distribution function is nonlinear; and
rejecting network packets from the stream of network packets that exceed available tokens and the allowed application use.

* * * * *